(12) United States Patent
Oobuchi

(10) Patent No.: US 6,893,728 B2
(45) Date of Patent: May 17, 2005

(54) LOW TEMPERATURE-FIRED PORCELAIN AND ELECTRONIC PARTS

(75) Inventor: Takeshi Oobuchi, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 10/343,933

(22) PCT Filed: Jun. 25, 2002

(86) PCT No.: PCT/JP02/06332

§ 371 (c)(1),
(2), (4) Date: Apr. 30, 2003

(87) PCT Pub. No.: WO03/002481

PCT Pub. Date: Jan. 9, 2003

(65) Prior Publication Data

US 2003/0171202 A1 Sep. 11, 2003

(30) Foreign Application Priority Data

Jun. 27, 2001 (JP) .......................................... 2001-195030

(51) Int. Cl.$^7$ ............................ B32B 15/04; C03C 10/10
(52) U.S. Cl. ................... 428/469; 428/697; 428/702; 501/4; 501/7; 501/153; 501/154
(58) Field of Search ............................... 501/4, 5, 6, 7, 501/153, 154; 428/469, 699, 701, 702

(56) References Cited

FOREIGN PATENT DOCUMENTS

| EP | 1 022 264 A2 | 7/2000 |
|---|---|---|
| JP | A 61-266348 | 11/1986 |
| JP | A 5-243810 | 9/1993 |
| JP | A 2000-211969 | 8/2000 |
| JP | A 2000-211970 | 8/2000 |

*Primary Examiner*—Stephen Stein
(74) *Attorney, Agent, or Firm*—Oliff & Berridge, PLC

(57) ABSTRACT

The present invention provides a low temperature fired porcelain comprising crystalline phases including sanbornite, celsian and β-cristobalite phases when measured by a high power X-ray diffractometer. The ratio of the peak intensity of (101) plane of α-cristobalite phase to the peak intensity of (101) plane of sanbornite phase is not higher than 5%. The porcelain is of a low temperature fired porcelain of silica-alumina-barium oxide system with cristobalite phase precipitated, in which the incidence of cracks in the porcelain may be reduced.

20 Claims, No Drawings

LOW TEMPERATURE-FIRED PORCELAIN AND ELECTRONIC PARTS

This is a 371 application of PCT/JP02/06332 filed Jun. 25, 2002 which claims priority to Japanese Patent Application 2001-195030 filed Jun. 27, 2001.

BACKGROUND OF THE INVENTION

1. Field of the Invention

The invention relates to a low temperature-fired porcelain and an electronic part using the porcelain.

2. Related Art Statement

A laminate type dielectric filter has been used as a high frequency circuit filter, such as a top filter, interstage filter for transmission, local filter and interstage filter for reception, in a high frequency circuit radio instrument such as a cellular phone. Examples of such laminate type dielectric filters are disclosed, for example, in a publication JP-A-243810/1993.

The laminate type dielectric filter may be produced as follows. Ceramic powder for producing a dielectric material is shaped to provide a plurality of green sheets. A given conductive paste is printed on each green sheet to form a conductive paste layer with a predetermined electrode pattern on each green sheet. The obtained green sheets are then laminated to form a laminated body. The laminated body is then heated so that the green sheets and conductive paste layers are simultaneously sintered and densified.

The electrode is generally made of a metallic conductor with a low melting point, such as a silver-based conductor, copper-based conductor or nickel-based conductor. Such metallic conductor has a low melting point, for example, of not higher than 1100° C. and sometimes as low as around 930° C. It is therefore necessary to fire the laminate body at a firing temperature lower than the melting point of the metal constituting the electrode pattern.

It has been desired to provide a porcelain with a low optimum firing temperature (low temperature-fired porcelain) having a reduced dielectric constant $\epsilon r$ and improved quality coefficient Q. Such porcelain is indispensable for reducing the stray capacity, delay time and high frequency loss of a resonator and condenser housed. The assignee or applicant filed a Japanese Patent publication JP 211,969/2000A, and disclosed a low temperature fired porcelain with a optimum firing temperature not higher than 1000° C., a dielectric constant of not higher than 10 and a quality coefficient Q of not higher than 2500. This is a porcelain of silica-alumina-barium oxide system, in which celsian phase of a high strength is precipitated.

DISCLOSURE OF THE INVENTION

To utilize a low-temperature fired porcelain as a resonator or a condenser housed, it is necessary to reduce the difference of the thermal expansions of the porcelain, an inner electrode and outer electrode. It is thus generally needed to control the linear expansion coefficient of the porcelain or electrode. To control the thermal expansion of a low-temperature fired porcelain of silica-alumina-barium oxide system, it is effective to control the content of a $SiO_2$ single phase (for example, cristobalite, quartz, tridymite). When cristobalite phase is precipitated in such porcelain, however, cracks may be observed after plating or lead-free plating processes, resulting in increased yield of off-specification products.

An object of this invention is to provide a low-temperature fired porcelain of silica-alumina-barium oxide system with cristobalite phase precipitated, in which the incidence of cracks in the porcelain may be reduced.

The present invention provides a low temperature-fired porcelain comprising crystalline phases including at least sanbornite, celsian and β-cristobalite phases. The porcelain has a ratio of the peak intensity of (101) plane of α-cristobalite phase to the peak intensity of (101) plane of sanbornite phase (α-cristobalite phase/sanbornite phase) is not higher than 5%, when measured by a high power X-ray diffractometer.

Moreover, this invention provides a low temperature-fired porcelain comprising a silicon component, an aluminum component and at least one of a barium component and a zinc component. The sum of the contents of barium and zinc components is 46.0 to 56.0 weight percent when calculated as BaO and ZnO, the content of a silicon component is 39.0 to 47.0 weight percent when calculated as $SiO_2$ and the content of an aluminum component is 0.5 to 10.0 weight percent when calculated as $Al_2O_3$.

Further, this invention provides an electronic part, wherein at least a part of which is composed of the low temperature-fired porcelain.

The inventor has performed extensive investigation on the occurrence of cracks in a low temperature-fired porcelain of silica-alumina-barium oxide system to obtain the following knowledge. That is, for example, metal paste is applied on such porcelain, which is then sintered at a temperature of 850 to 1000° C. In this occasion, a cristobalite phase is precipitated in the post-fired porcelain to decrease the linear expansion coefficient of the porcelain. Thereafter, a plated layer or lead-free soldered layer is formed on a metal electrode. The temperature for this process is much lower than a firing temperature (850 to 1000° C.) ordinarily applied for the porcelain. It is therefore considered unlikely that the process affects crack formation in the porcelain. However, it has been proved that such process after the firing of the porcelain greatly affects the formation of cracks, even though the process is performed at a relatively low temperature.

The inventor has performed extensive investigation on the cause of the crack formation and finally found that phase transformation of a cristobalite phase is a main factor affecting the crack formation. A cristobalite phase includes β-cristobalite and α-cristobalite phases. β-cristobalite phase is stable under a high-temperature typically not lower than 300° C. and α-cristobalite phase is stable at a low-temperature. In general β-cristobalite phase is a high-temperature phase. However, in a low temperature-fired porcelain article containing particles of β-cristobalite phase, the particle of β-cristobalite phase is constrained by the surrounding particles of the other crystallographic phases, thereby phase transformation of β-cristobalite phase into α-cristobalite phase may be prevented.

It is considered that a relatively small amount of α-cristobalite phase in the porcelain is transformed into β-cristobalite phase when the above low-temperature process is carried out at a temperature in a range of 200° C. to 300° C. Such phase transformation might result in change of the linear expansion coefficient. In general, change of a linear expansion coefficient due to phase transformation is considered to be dependent on the rate of phase transformation. When the rate of phase transformation is larger (when the phase transformation is rapid), substantial change of the linear expansion coefficient may occur after the phase transformation, even if the amount of the transformed crystalline phase is small. However, quantitative measurement of the rate of phase transformation is quite difficult and there is no approved theory for realizing such measurement. In addition to this, there has been no report predicting the rate of phase transformation of a certain crystalline phase in a certain porcelain. It has been therefore difficult to predict the rate of phase transformation of a relatively small amount of α-cristobalite phase into β-cristobalite phase and the change of the linear expansion coefficient of the porcelain system of the present invention.

The present invention provides a low temperature-fired porcelain comprising crystalline phases including at least sanbornite, celsian and β-cristobalite phases. In the porcelain, it is possible to prevent the crack formation by reducing the ratio of the peak intensity of (101) plane of α-cristobalite phase to the peak intensity of (101) plan of sanbornite phase to a value not higher than 5%.

Respective crystallographic phases in the porcelain according to the present invention are as follows.

Sanbornite phase ($BaSi_2O_5$) has an X-ray diffraction peak of JCPDS card No. 26-0176.

Celsian phase ($BaAl_2Si_2O_8$) has an X-ray diffraction peak of JCPDS card No. 38-1450.

β-cristobalite phase ($SiO_2$) has an X-ray diffraction peak of JCPDS card No. 27-0605.

α-cristobalite phase ($SiO_2$) has an X-ray diffraction peak of JCPDS card No. 39-1425.

In this invention, the X-ray diffraction chart and the peak intensities are measured under the following conditions.

X-ray diffractometer: "RINT 2500" manufactured by RIGAKU Co Ltd
Vessel: Cu
X-ray tube voltage: 50 kV
X-ray tube current: 300 mA
Monochromator: Incident side Ge
Divergence slit: ½ deg
Scattering slit: ½ deg
Light-intercepting slit: 0.15 mm
Step: 0.02 deg
Counting time: 7.00 sec

BEST MODES TO CARRY OUT THE INVENTION

The ratio of the peak intensity of (101) plane of α-cristobalite phase to the peak intensity of (101) plane of sanbornite phase may preferably be not higher than 4%, and more preferably be not higher than 2%. Moreover, the peak intensity of α-cristobalite phase may most preferably be under the detection limit of the above X-ray diffractometer.

The ratio of the peak intensity of (−220) plane of celsian phase to the peak intensity of (101) plane of sanbornite phase may preferably be not lower than 1%, and may preferably be not higher than 20%.

The sum of the contents of sanbornite, celsian and β-cristobalite phases may preferably be not lower than 90 weight percent and more preferably be not lower than 95 weight percent of the total content of crystalline phases in the porcelain.

The presence of any crystalline phase other than sanbornite, celsian, β-cristobalite and α-cristobalite phases may particular preferably be lower than the detection limit under the detection conditions as described above.

The low temperature-fired porcelain according to this invention may preferably contain a silicon component in not lower than 20 weight percent when calculated as $SiO_2$, for reducing the dielectric constant of the porcelain to a value not higher than 10. The content of a silicon component when calculated as $SiO_2$ may preferably be not lower than 30 weight percent for further reducing the dielectric constant. The. content of a silicon component when calculated as $SiO_2$ may preferably be not higher than 80 weight percent for reducing the optimum firing temperature of the porcelain. The content may more preferably be not higher than 65 weight percent from this aspect.

In the low-temperature fired porcelain according to the invention, the content of an aluminum component may preferably be not lower than 0.1 weight percent when calculated as $Al_2O_3$. The content of celsian phase with a high mechanical strength may thereby be increased in the porcelain, so that the strength of a substrate made of the inventive porcelain may be improved to a value not lower than 2000 kg/cm². The content of an aluminum component calculated as $Al_2O_3$ may more preferably be not lower than 2.0 weight percent from this aspect. The content of an aluminum component calculated as $Al_2O_3$ may preferably be not higher than 20 weight percent and more preferably be not higher than 15 weight percent, for reducing the optimum firing temperature of the porcelain.

In the low temperature fired porcelain according to the invention, the content of a barium component when calculated as BaO may preferably be not lower than 10 weight percent and more preferably be not lower than 30 weight percent, for further improving the quality coefficient Q of the porcelain. The content of a barium component when calculated as BaO may preferably be not higher than 64 weight percent for obtaining a dielectric constant εr of not higher than 10. The content of a barium component when calculated as BaO may more preferably be not higher than 60 weight percent for further reducing the dielectric constant εr The content of a zinc component when calculated as ZnO may preferably be not lower than 0.5 weight percent (more preferably be not lower than 2.0 weight percent), for reducing the thermal expansion coefficient of the porcelain and for improving the sinterability. The porcelain may thereby be sintered at a lower firing temperature. The content of a zinc component when calculated as ZnO may preferably be not higher than 20 weight percent (more preferably be not higher than 15 weight percent), for further improving the quality coefficient Q of the porcelain.

The followings are the compositions particularly preferred in this invention for preventing the precipitation of α-cristobalite phase.

Total Content of Barium and Zinc Components

The total content may preferably be 46.0 to 56.0 weight percent when calculated as BaO and ZnO. (The total content may more preferably be not lower than 48.0 weight percent and most preferably be not lower than 49.5 weight percent. The total content may more preferably be not higher than 54.0 weight percent and most preferably be not higher than 52.5 weight percent).

The Content of a Barium Component

The BaO content may more preferably be not lower than 40 weight percent (most preferably be not lower than 42 weight percent). The BaO content may more preferably be not higher than 51 weight percent (most preferably be not higher than 49 weight percent).

The Content of a Zinc Component

The ZnO content may more preferably be not lower than 1.0 weight percent, or more preferably be not higher than 10.0 weight percent.

The Content of a Silicon Component

The content of a silicon component may more preferably be 39.0 to 47.0 weight percent when calculated as $SiO_2$. (The content may more preferably be not lower than 39.5 weight percent. The content may more preferably be not higher than 41.0 weight percent and most preferably be not higher than 40.5 weight percent.).

The Content of an Aluminum Component

The content of an aluminum component may more preferably be 0.5 to 10.0 weight percent when calculated as $Al_2O_3$. (The content may more preferably be not lower than 1.0 weight percent and most preferably be not lower than 2.0 weight percent. The content may more preferably be not higher than 5.0 weight percent and most preferably be not higher than 4.0 weight percent.).

In a preferred embodiment, $Bi_2O_3$ (porcelain component) and a low-melting point glass containing $B_2O_3$ are used concurrently. The quality coefficient Q of the porcelain may thereby be improved and incidence of cracks in the porcelain may be further reduced.

The content of a boron component when calculated as $B_2O_3$ may preferably be not higher than 1.5 weight percent for improving the quality coefficient Q of the porcelain to a value not lower than 2500. The content of a boron component calculated as $B_2O_3$ may more preferably be not higher than 1.0 weight percent and most preferably be not higher than 0.9 weight percent, for further improving the quality coefficient Q of the porcelain. The content of a boron component calculated as $B_2O_3$ may be not lower than 0.3 weight percent, and the porcelain may thereby be sintered at a lower temperature. The content of a boron component calculated as $B_2O_3$ may more preferably be not lower than 0.5 weight percent and most preferably be not lower than 0.6 weight percent.

The incidence of cracks in the porcelain may be reduced by adding a bismuth component in the formulation. This effect is most considerable in the following three cases. A metallic electrode is laminated on the porcelain according to the invention. Alternatively, a metallic electrode is contacted on a green sheet to be fired for the inventive porcelain and the green sheet is then fired. Alternatively, a metallic electrode is embedded within a green sheet for producing the inventive porcelain and the green sheet is then fired. When a bismuth component is contained, the content of a bismuth component is not limited, as far as the presence of a bismuth component may be confirmed by means of fluorescence X-ray analysis. The content of a bismuth component when calculated as $Bi_2O_3$ may preferably be not lower than 0.1 weight percent, more preferably be not lower than 0.5 weight percent and still more preferably be not lower than 1.0 weight percent (The content of a bismuth component may further preferably be not lower than 1.5 weight percent and most preferably be not lower than 2.0 weight percent).

The content of a bismuth component when calculated as $Bi_2O_3$ may preferably be not higher than 20 weight percent, for further improving the quality coefficient Q. The content may more preferably be not higher than 15 weight percent and still more preferably be not higher than 10 weight percent. The content of a bismuth component calculated as $Bi_2O_3$ may more preferably be not higher than 7.0 weight percent and most preferably be not higher than 6.0 weight percent.

The porcelain according to the invention may be substantially composed of a barium component, a silicon component and an aluminum component. Alternatively, the porcelain may be substantially composed of a barium component, a silicon component, an aluminum component, a boron component, a zinc component and a bismuth component. In these cases, however, the porcelain may contain inevitable impurities derived from each of raw materials for supplying the above metal components. Further, the porcelain according to the invention may contain an oxide or metal component other than the components described above. Such additional oxide or metal component include, for example, MgO, CaO, SrO, $Y_2O_3$, $V_2O_5$, MnO, $Mn_2O_3$, CoO, NiO, $Nd_2O_3$, $Sm_2O_3$, $La_2O_3$, CuO, Ag, Cu, Ni and Pd.

Electronic parts for applying the invention are not particularly limited, and include laminated dielectric filters, multi-layered circuit boards, dielectric antennas, dielectric couplers and dielectric composite modules.

In the electronic part according to this invention, the low temperature-fired porcelain may preferably be connected to an additional portion of the electronic part. The additional portion is not particularly limited and may preferably be a dielectric layer, a magnetic layer, a piezoelectric layer or a metal electrode.

The material for the metal electrode used in the electronic part according to the invention is not particularly limited. Such material may preferably be silver, copper, nickel, or the alloys of these metals, or the mixture of theses metals. The material may more preferably be silver, the alloy of silver and the other metal or the mixture of silver and the other metal, and most preferably be silver.

Moreover, a plated layer and/or a soldered layer can be provided on the metal electrode. The examples of the components of the plated layer are Ni and Sn. The examples of the components of the soldered layer include Sn—Pb, Sn—Pb—Ag, Sn—Pb—Sb, Sn—Pb—In—Sb—Ag, Sn—Pb—Ag—Cu, Sn—Zn—In, Sn—Ag, Sn—Ag—Bi—Cu, Sn—Ag—Cu, Sn—Cu, Sn—Sb—Ag—Cu and Sn.

The low temperature-fired porcelain according to the invention may be integrated with another low temperature-fired porcelain with a dielectric constant of not lower than 10 and not higher than 150, in the electronic part according to the invention.

The composition for such porcelain is not particularly limited, and may preferably be one of the following compositions.

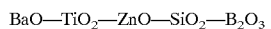
$BaO—TiO_2—ZnO—SiO_2—B_2O_3$

$BaO—TiO_2—Bi_2O_3—Nd_2O_3—ZnO—SiO_2—B_2O_3$

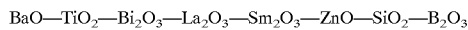
$BaO—TiO_2—Bi_2O_3—La_2O_3—Sm_2O_3—ZnO—SiO_2—B_2O_3$

$MgO—CaO—TiO_2—ZnO—Al_2O_3—SiO_2—B_2O_3$

The examples of the magnetic materials constituting the magnetic layer can be listed as follows.

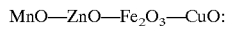
$MnO—ZnO—Fe_2O_3—CuO:$

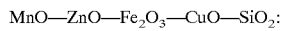
$MnO—ZnO—Fe_2O_3—CuO—SiO_2:$

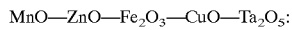
$MnO—ZnO—Fe_2O_3—CuO—Ta_2O_5:$

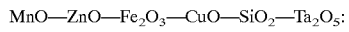
$MnO—ZnO—Fe_2O_3—CuO—SiO_2—Ta_2O_5:$

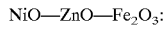
$NiO—ZnO—Fe_2O_3:$

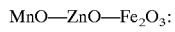
$MnO—ZnO—Fe_2O_3:$

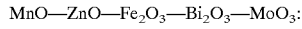
$MnO—ZnO—Fe_2O_3—Bi_2O_3—MoO_3:$

$NiO—CuO—ZnO$

The examples of the piezoelectric materials constituting the piezoelectric layer can be listed as follows.

$PbO-ZrO_2-TiO_2$: $PbO-ZrO_2-TiO_2-Sb_2O_3$:

$K_2O-Na_2O-Li_2O-Nb_2O_5-Ta_2O_5-Bi_2O_3$:

$PbO-CoO-Nb_2O_3-ZrO_2-TiO_2$:

$PbO-MgO-Nb_2O_3-Yb_2O_3-TiO_2-ZrO_2$:

$BaO-TiO_2$

The low temperature-fired porcelain according to the invention may preferably be produced as follows. Starting raw materials of the metal components are mixed in a given ratio to obtain mixed powder, which is then heated at a temperature between 850 to 1200° C. to obtain a calcined body. The calcined body is crushed to provide ceramic powder. The ceramic powder is shaped, preferably with glass powder composed of $SiO_2$, $B_2O_3$ and ZnO, to form a green sheet, which is then fired at a temperature from 850 to 930° C. to obtain the porcelain of the invention. Each of the starting materials for metal components may be the oxide, nitrate, carbonate or sulfate of each metal element.

EXAMPLES

Production of Ceramic Powder

Powdery raw materials of barium carbonate, aluminum oxide, silicon oxide, zinc oxide and bismuth oxide were weighed in a given ratio and wet mixed to obtain mixed powder. The mixed powder was then calcined at 900° C. to 1000° C. to obtain a calcined body, which was crushed to provide calcined powder. The calcined powder was subjected to powdery X-ray diffraction analysis to measure the crystalline phases and crystallinity. The calcined powder was then ground using a ball mill into a predetermined particle size to provide ceramic powder, which was dried.

Production of Glass Powder

Powdery raw materials of zinc oxide, boron oxide and silicon oxide were weighed and dry mixed to obtain mixed powder, which was then melted in a platinum crucible to provide a melt. The melt was dipped into water for rapid cooling to provide a massy glass. The glass was wet crushed to obtain glass powder with a low melting point.

Production of Samples for Evaluating Dielectric Properties

The thus obtained ceramic powder and glass powder were wet mixed in ion exchange water with an organic binder by using an alumina pot and alumina balls, thereby providing slurry. The slurry was dried to obtain mixed powder, which was then shaped using a metal press into a predetermined shape to provide a shaped body. The shaped body was fired at a temperature of 900 to 930° C. to obtain a sintered body. The dielectric constant $\epsilon r$ at 3 GHz was then measured.

Production of Samples for Evaluating Cracks

The ceramic powder and glass powder described above were wet mixed in an organic solvent with a plasticizer, a dispersant and an organic binder using an alumina pot and alumina balls to provide slurry for shaping green sheets. The slurry was shaped using a doctor blade application system to provide green sheets, each sheet having a thickness of 0.03 to 2 mm.

Evaluation of Crack Formation

A condenser electrode pattern or resonator electrode pattern was screen printed on each green sheet using Ag—Pt (Pt 1% by weight) paste. A plurality of the green sheets were then laminated to obtain a laminated body, which was cut into chips each having dimensions of 11 mm×8 mm×3mm using a dicer. Each chip was then fired at a temperature of 850 to 930° C. for 2 hours to obtain each fired body. Then the fired body was washed and electrolytic plating was performed in nickel, and then in stannum neutral solution. The obtained sample was washed. Each sample was subjected to the evaluation of crack formation. The crack formation was evaluated based on an image data of ultrasonic echo reflection from the cracks by means of a ultrasonic crack inspection system ("My Scope" manufactured by Hitachi Construction Machinery). One hundred samples were evaluated for each sample and yield of off-specification products is shown in tables.

Measurement of X-ray Diffraction Peaks

For each porcelain sample, X-ray diffraction peaks were measured under the conditions described above. Moreover, the ratio of the peak intensity of (101) plane of α-cristobalite phase to the peak intensity of (101) plane of sanbornite phase is shown in tables 1 to 4. Moreover, presence or absence of a crystalline phase other than sanbornite, celsian, β-cristobalite and α-cristobalite phases is shown in table 4. Moreover, the optimum firing temperature is defined as a temperature at which the change of dielectric constant $\epsilon r$ against the change of the firing temperature is within 0.1/° C.

The Difference of the Linear Expansion Coefficients of the Porcelain Sample and an External Electrode The respective linear expansion coefficients (250° C.) of an external electrode and of each experimental sample were measured using a thermal expansion measuring system. The difference of the thermal expansion coefficients was thus obtained.

Experimental Results

In the above-described experiments, the ratios of respective metals were changed as shown in tables 1 to 4. The above-described properties were measured for each sample and the results were shown in tables 1 to 4.

TABLE 1

| | BaO + ZnO | SiO2 | Al2O3 | Bi2O3 | B2O3 | Ratio of peak Strength α-cristobalite/ sanbornite phase (%) | Ratio of peak Strength β-cristobalite/ Sanbornite Phase (%) | Difference of Thermal expansion Coefficient from External electrode (250° C.: ppm/° C.) | Incidence Of Cracks | Optimum Temperature Range for Sintering (° C.) |
|---|---|---|---|---|---|---|---|---|---|---|
| A1 | 45.5 | 47.5 | 3.0 | 3.4 | 0.6 | 12 | 20 | 3.2 | 86/100 | 880~930 |
| A2 | 46.0 | 47.0 | 1.0 | 5.2 | 0.8 | 5 | 13 | 1.2 | 2/100 | 880~930 |
| A3 | 48.0 | 39.0 | 5.0 | 7.0 | 1.0 | 2 | 10 | 0.8 | 0/100 | 880~930 |
| A4 | 49.5 | 39.5 | 4.0 | 6.5 | 0.5 | Below detection limit | 8 | 0.5 | 0/100 | 880~930 |
| A5 | 51.0 | 40.0 | 3.0 | 5.2 | 0.8 | Below detection limit | 6 | 0.4 | 0/100 | 880~930 |
| A6 | 52.5 | 40.5 | 3.0 | 3.3 | 0.7 | Below detection limit | 4 | 0.5 | 0/100 | 880~930 |
| A7 | 54.0 | 41.0 | 1.5 | 2.6 | 0.9 | Below detection limit | 3 | 0.6 | 0/100 | 880~930 |
| A8 | 56.0 | 39.0 | 2.0 | 2.0 | 1.0 | Below detection limit | 2 | 1.0 | 1/100 | 880~930 |
| A9 | 56.5 | 38.0 | 2.4 | 2.5 | 0.6 | Below detection limit | Below detection limit | 1.7 | 19/100 | 880~930 |

TABLE 2

| | BaO + ZnO | SiO2 | Al2O3 | Bi2O3 | B2O3 | Ratio of peak strength α-cristobalite/ sanbornite phase (%) | Ratio of peak Strength β-cristobalite/ Sanbornite Phase (%) | Difference of Thermal expansion Coefficient from External electrode (250° C.: ppm/° C.) | Incidence Of Cracks | Optimum Temperature Range for Sintering (° C.) |
|---|---|---|---|---|---|---|---|---|---|---|
| B1 | 52.5 | 40.5 | 0.2 | 6.2 | 0.6 | Below detection limit | 4 | 0.7 | 0/100 | 830~870 |
| B2 | 51.3 | 40.4 | 0.5 | 7.0 | 0.8 | Below detection limit | 5 | 0.5 | 0/100 | 850~890 |
| B3 | 52.5 | 41.7 | 1.0 | 3.8 | 1.0 | Below detection limit | 6 | 0.6 | 0/100 | 880~930 |
| B4 | 50.7 | 43.5 | 2.0 | 3.3 | 0.5 | Below detection limit | 5 | 0.5 | 0/100 | 880~930 |
| B5 | 51.0 | 42.2 | 3.0 | 3.1 | 0.7 | Below detection limit | 4 | 0.6 | 0/100 | 880~930 |
| B6 | 52.5 | 40.5 | 4.0 | 2.1 | 0.9 | Below detection limit | 5 | 0.5 | 0/100 | 880~930 |
| B7 | 49.5 | 39.5 | 5.0 | 5.2 | 0.8 | Below detection limit | 4 | 0.7 | 0/100 | 880~930 |
| B8 | 46.2 | 40.0 | 10.0 | 3.1 | 0.7 | Below detection limit | 2 | 1.0 | 2/100 | 880~930 |
| B9 | 47.2 | 39.0 | 11.0 | 2.0 | 0.8 | Below detection limit | Below detection limit | 1.8 | 23/100 | 880~930 |

TABLE 3

| | BaO + ZnO | SiO2 | Al2O3 | Bi2O3 | B2O3 | Ratio of peak Strength α-cristobalite/ sanbornite phase (%) | Ratio of peak Strength β-cristobalite/ Sanbornite Phase | Difference of Thermal expansion Coefficient from External electrode (250° C.: ppm/° C.) | Incidence Of Cracks | Optimum Temperature Range for Sintering (° C.) |
|---|---|---|---|---|---|---|---|---|---|---|
| C1 | 53.4 | 40.5 | 5.0 | 0.5 | 0.6 | Below detection limit | 6 | 0.5 | 0/100 | 850~900 |
| C2 | 52.8 | 42.7 | 3.0 | 1.0 | 0.5 | Below detection limit | 6 | 0.4 | 0/100 | 860~910 |
| C3 | 51.6 | 41.7 | 4.0 | 1.5 | 0.7 | Below detection limit | 6 | 0.5 | 0/100 | 880~930 |
| C4 | 50.4 | 43.7 | 1.0 | 2.0 | 0.9 | Below detection limit | 6 | 0.3 | 0/100 | 880~930 |
| C5 | 51.2 | 40.1 | 3.0 | 5.0 | 0.7 | Below detection limit | 6 | 0.4 | 0/100 | 880~930 |
| C6 | 49.2 | 40.5 | 4.0 | 6.0 | 0.8 | Below detection limit | 5 | 0.4 | 0/100 | 880~930 |
| C7 | 49.5 | 39.5 | 3.0 | 7.0 | 1.0 | Below detection limit | 5 | 0.4 | 0/100 | 880~930 |
| C8 | 46.3 | 40.0 | 3.0 | 10.0 | 0.7 | Below detection limit | 5 | 0.5 | 0/100 | 890~940 |
| C9 | 47.2 | 39.0 | 2.0 | 11.0 | 0.8 | Below detection limit | 6 | 0.4 | 0/100 | 900~950 |

TABLE 4

| | BaO + ZnO | SiO2 | Al2O3 | Bi2O3 | B2O3 | Ratio of peak Strength α-cristobalite/ sanbornite phase (%) | Ration of peak Strength β-cristobalite/ Sanbornite Phase (%) | Difference of Thermal Expansion Coefficient from External electrode (250° C.: ppm/° C.) | Incidence Of Cracks | Crystalline phase other than targeted phases | Optimum Temperature Range for Sintering (° C.) |
|---|---|---|---|---|---|---|---|---|---|---|---|
| D1 | 51.2 | 40.5 | 4.0 | 4.1 | 0.2 | Below detection limit | 7 | 0.5 | 0/100 | None | 850~900 |
| D2 | 52.9 | 42.0 | 1.0 | 3.8 | 0.3 | Below detection limit | 7 | 0.4 | 0/100 | None | 860~910 |
| D3 | 52.5 | 41.7 | 3.0 | 2.3 | 0.5 | Below detection limit | 6 | 0.5 | 0/100 | None | 880~930 |
| D4 | 50.7 | 43.5 | 1.0 | 4.2 | 0.6 | Below detection limit | 6 | 0.3 | 0/100 | None | 880~930 |
| D5 | 50.2 | 41.4 | 5.0 | 2.7 | 0.7 | Below detection limit | 6 | 0.3 | 0/100 | None | 880~930 |
| D6 | 51.0 | 39.0 | 4.0 | 5.2 | 0.9 | Below detection limit | 5 | 0.4 | 01100 | None | 880~930 |
| D7 | 51.6 | 39.5 | 3.0 | 4.9 | 1.0 | Below detection limit | 5 | 0.4 | 0/100 | None | 890~940 |
| D8 | 51.0 | 43.0 | 2.0 | 2.5 | 1.5 | Below detection limit | 5 | 0.5 | 0/100 | None | 900~950 |
| D9 | 50.2 | 39.8 | 5.0 | 3.0 | 2.0 | Below detection limit | 6 | 0.3 | 0/100 | None | 930~970 |

In each sample in table 1, the content of (BaO+ZnO) and (SiO$_2$) was mainly changed. The ratio of the peak intensity of (101) plane of α-cristobalite phase to the peak intensity of (101) plane of sanbornite phase (hereafter, referred to "said ratio") was successfully controlled to a value not higher than 5%. As a result, by controlling said ratio to a value not higher than 5%, the difference of the thermal expansion coefficients at 250° C. of an external electrode and the porcelain may be reduced. It was confirmed that the crack formation after the production of the external electrode was inhibited.

In each sample in table 2, the content of Al$_2$O$_3$ was mainly changed. Moreover, by controlling said ratio to a value not higher than 5%, the difference of the thermal expansion coefficients at 250° C. of an external electrode and the porcelain sample may be reduced. It was confirmed that the crack formation after the production of the external electrode was inhibited. In B1, the range of the optimum firing temperature shifted to a lower temperature range.

In each sample in table 3, the content of Bi$_2$O$_3$ was mainly changed. Moreover, by controlling said ratio to a value not higher than 5%, the difference of the thermal expansion coefficients at 250° C. of an external electrode and the porcelain may be reduced. It was confirmed that the crack formation after the production of the external electrode was inhibited. In C1, the range of the optimum firing temperature shifted to a lower temperature range. In C9, the range of the optimum firing temperature shifted to a higher temperature range.

In each sample in table 4, the content of B$_2$O$_3$ was mainly changed. Moreover, by controlling said ratio to a value not higher than 5%, the difference of the thermal expansion coefficients at 250° C. of an external electrode and the porcelain sample may be reduced. It was confirmed that the crack formation after the production of the external electrode was inhibited. In D1, the range of the optimum firing temperature shifted to a lower temperature range. In D9, the range of the optimum firing temperature shifted to a higher temperature range.

Meanwhile, when an inner electrode of Cu or Ag is co-fired, the range of the optimum temperature lies in 880°

C. to 930° C. Therefore, the range of the optimum firing temperature for the porcelain samples according to the present invention may preferably be in a range of 880° C. to 930° C. Even on this point of view, the porcelain samples according to the present invention are preferable for use in an electronic part.

As described above, according to the present invention, the incidence of cracks may be reduced in a low temperature fired porcelain of silica-alumina-barium oxide system with a cristobalite phase precipitated.

What is claimed is:

1. A low temperature-fired porcelain comprising crystalline phases including at least sanbornite phase, celsian phase and β-cristobalite phase, wherein said porcelain has a ratio of a peak intensity of (101) plane of α-cristobalite phase to a peak intensity of (101) plane higher than 5%, when measured by means of a high power X-ray diffractometer.

2. The porcelain of claim 1, wherein said peak intensity of (101) plane of a-cristobalite phase is lower than the detection limit of said high power X-ray diffractometer.

3. The porcelain of claim 1, wherein the content of a crystalline phase other than sanbornite phase, celsian phase, β-cristobalite phase and α-cristobalite phase is lower than the detection limit of said high power X-ray diffractometer.

4. The porcelain of any one of claims 1, comprising a barium component in a calculated amount of 10 to 64 weight percent when calculated as BaO, a silicon component in a calculated amount of 20 to 80 weight percent when calculated as $SiO_2$, an aluminum component in a calculated amount of 0.1 to 20 weight percent when calculated as $Al_2O_3$, a boron component in a calculated amount of 0.3 to 1.0 weight percent when calculated as $B_2O_3$, a zinc component in a calculated amount of 0.5 to 20 weight percent when calculated as ZnO, and a bismuth component in a calculated amount of not higher than 20 weight percent when calculated as $Bi_2O_3$.

5. The porcelain of any one of claims 1, comprising a silicon component, an aluminum component and at least one of a barium component and a zinc component, wherein the sum of contents of said barium component and said zinc component is 46.0 to 56.0 weight percent when calculated as BaO and ZnO, the content of said silicon component is 39.0 to 47.0 weight percent when calculated as $SiO_2$, and the content of said aluminum component is 0.5 to 10.0 weight percent when calculated as $Al_2O_3$.

6. The porcelain of claim 5, wherein the sum of contents of said barium component and said zinc component is 48.0 to 54.0 weight percent when calculated as BaO and ZnO, the content of said silicon component is 39.0 to 41.0 weight percent when calculated as $SiO_2$, and the content of said aluminum component is 1.0 to 5.0 weight percent when calculated as $Al_2O_3$.

7. The porcelain of claim 5, comprising a boron component in a calculated amount of 0.3 to 1.5 weight percent when calculated as $B_2O_3$ and a bismuth component in a calculated amount of 1.0 to 10.0 weight percent when calculated as $Bi_2O_3$.

8. The porcelain of claim 7 being substantially composed of said barium component, said silicon component, said aluminum component, said boron component, said zinc component and said bismuth component.

9. The porcelain of any one of claims 4, being produced using a glass material containing $B_2O_3$ and a ceramic material containing $Bi_2O_3$ as starting materials.

10. The porcelain of claim 9, wherein said glass material contains $SiO_2$, $B_2O_3$, and ZnO.

11. A low temperature-fired porcelain comprising a silicon component, an aluminum component, a bismuth component and at least one of a barium component and a zinc component, wherein the sum of contents of said barium component and said zinc component is 46.0 to 56.0 weight percent when calculated as BaO and ZnO, the content of said silicon component is 39.0 to 47.0 weight percent when calculated as $SiO_2$, the content of said aluminum component is 0.5 to 10.0 weight percent when calculated as $Al_2O_3$.

12. The porcelain of claim 11, wherein the sum of contents of said barium component and said zinc component is 48.0 to 54.0 weight percent when calculated as BaO and ZnO, the content of said silicon component is 39.0 to 41.0 weight percent when calculated as $SiO_2$ and the content of said aluminum component is 1.0 to 5.0 weight percent when calculated as $Al_2O_3$.

13. The porcelain of claim 11, comprising a boron component in a calculated amount of 0.3 to 1.5 weight percent when calculated as $B_2O_3$ and a bismuth component in a calculated amount of 1.0 to 10.0 weight percent when calculated as $Bi_2O_3$.

14. The porcelain of claim 13 being substantially composed of said barium component, said silicon component, said aluminum component, said boron component, said zinc component and said bismuth component.

15. The porcelain of claim 13 being produced using a glass material containing $B_2O_3$ and a ceramic material containing $Bi_2O_3$ as starting materials.

16. The porcelain of claim 15, wherein said glass material contains $SiO_2$, $B_2O_3$, and ZnO.

17. The porcelain of any one of claims 11, comprising major crystalline phases including sanbornite phase, celsian phase and β-cristobalite phase, wherein said porcelain has a ratio of the peak intensity of (101) plane of α-cristobalite phase to the peak intensity of (101) plane of sanbornite phase of not higher than 5%, when measured by a high power X-ray diffractometer.

18. The porcelain of claim 17, wherein the peak intensity of (101) plane of α-cristobalite phase is lower than the detection limit of said high power X-ray diffractometer.

19. Am electronic part comprising a portion made of said low temperature-fired porcelain of any one of claims 1.

20. The electronic part of claim 19 comprising an additional portion, wherein said additional portion is a dielectric layer, a magnetic layer, a piezoelectric layer or a metal electrode and said low temperature-fired porcelain is connected with said additional portion.

* * * * *